*J. Turner.*

*Making Nuts.*

Nº 59,731. Patented Nov. 13, 1866.

Witnesses. Inventor.

UNITED STATES PATENT OFFICE.

JOHN TURNER, OF RICHMOND, VIRGINIA, ASSIGNOR TO HIMSELF AND JOHN G. HUNTER, OF SAME PLACE.

IMPROVEMENT IN ADJUSTABLE NUT-BOXES.

Specification forming part of Letters Patent No. 59,731, dated November 13, 1866.

*To all whom it may concern:*

Be it known that I, JOHN TURNER, of Richmond, in the county of Henrico and State of Virginia, have invented a new and useful Improvement in Boxes for Forming Metallic Nuts; and I do hereby declare that the following is a full, clear, and exact description thereof, which will enable others skilled in the art to make and use the same, reference being had to the accompanying drawings, forming part of this specification, in which—

Figure 1:
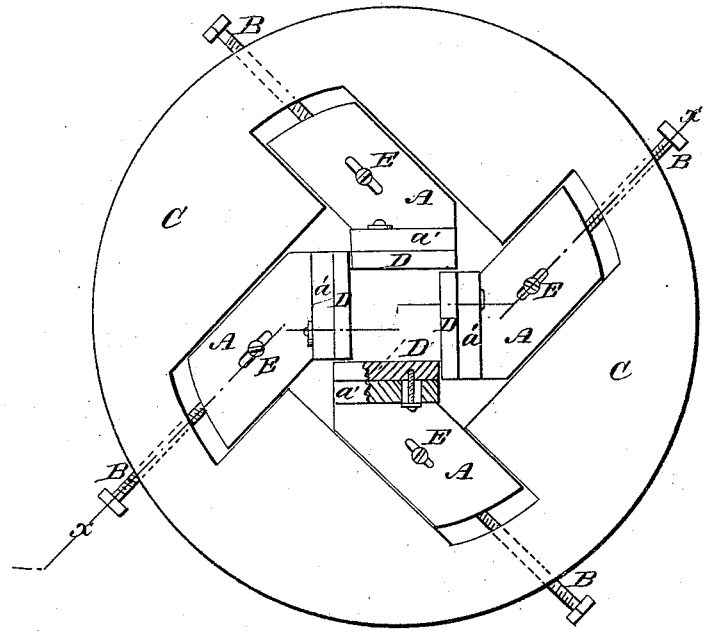
Figure 2:
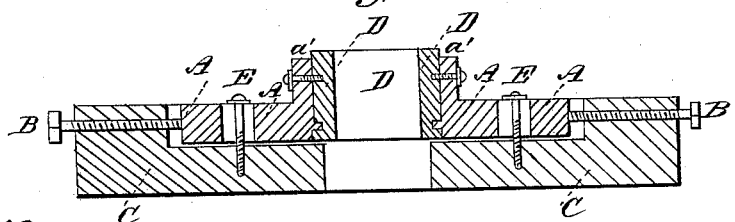

Figure 1 is a top or plan view of my improved machine. Fig. 2 is a detail sectional view taken through the line $x\ x$, Fig. 1.

Similar letters of reference indicate like parts.

My invention has for its object to furnish an improved die or box for punching metallic nuts, which can be reduced or enlarged to adapt it to nuts of different sizes, and by means of which the position of the center may be changed as desired within certain limits; and it consists, first, of a set of angular slides, in combination with each other and with the block or frame in which they are placed, and, second, in the combination of a set of steel slides, in combination with each other, with the angular slides, and with the block or frame in which they are placed.

C is the block or frame that forms the body of my improved machine. The upper side of this block is cut out, as shown in Figs. 1 and 2, for the reception of the slides A and D. The slides A are made in the form represented in the drawings, and have flanges or plates $a'$ formed or securely attached to their forward inclined ends. These slides A are secured in their places in the block C by set-screws E, passing through slots formed in the said slides, as shown in Figs. 1 and 2, and screwing into the block C, as seen in Fig. 2. By loosening up these set-screws E the slides A may be moved backward or forward in their places in the block C, so as to adjust the size of the box to the size of the nut required to be punched.

The slides A are pushed forward and held in their places while the machine is being used by the set-screws B, which enter through the edge of the block C and push against the ends of the slides A, as shown in Figs. 1 and 2.

D are steel slides, made in the form represented in Figs. 1 and 2, and fitting upon the ends of the slides A, as shown. In the rear face of the slides D are formed grooves, into which fit tongues formed upon the faces of the slides A, as shown in Fig. 2, and which act as guides to the slides D as they are moved back and forth along the faces of the slides A.

The slides D are secured at any desired position upon the faces of the slides A by the set-screws F, passing through slots formed in the flanges $a'$ of the slides A, and screwing into the said slides D, as shown in Figs. 1 and 2. This adjustment is for the purpose of throwing the box out of center to a limited extent, to accommodate it to the positions of other parts of the machine, when desired or necessary.

What I claim as new, and desire to secure by Letters Patent, is—

1. The angular slides A, in combination with each other and with the block or frame C, constructed and arranged substantially as herein described, and for the purpose set forth.

2. The combination of the steel slides D with each other, with the angular slides A, and with the block or frame C, constructed and arranged substantially as described, and for the purpose set forth.

JOHN TURNER.

Witnesses:
GEORGE W. FROPT,
WM. M. ARCHER.